(12) United States Patent
Bharaj et al.

(10) Patent No.: US 12,411,910 B2
(45) Date of Patent: *Sep. 9, 2025

(54) AUDIO SPOOF DETECTION USING ATTENTION-BASED CONTRASTIVE LEARNING

(71) Applicant: Reality Defender, Inc., New York, NY (US)

(72) Inventors: Gaurav Bharaj, Los Angeles, CA (US); Chirag Goel, Montreal (CA); Surya Koppisetti, Coquitlam (CA); Ben Colman, New York, NY (US); Ali Shahriyari, Las Vegas, NV (US)

(73) Assignee: Reality Defender, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,182

(22) Filed: Nov. 20, 2024

(65) Prior Publication Data

US 2025/0245296 A1 Jul. 31, 2025

Related U.S. Application Data

(63) Continuation of application No. 18/426,016, filed on Jan. 29, 2024, now Pat. No. 12,189,712.

(51) Int. Cl.
*G10L 25/30* (2013.01)
*G06F 18/2132* (2023.01)
(Continued)

(52) U.S. Cl.
CPC ...... *G06F 18/2132* (2023.01); *G06F 18/2415* (2023.01); *G10L 21/14* (2013.01);
(Continued)

(58) Field of Classification Search
CPC . G06F 18/2132; G06F 18/2415; G10L 21/14; G10L 25/18; G10L 25/30; G10L 25/51
See application file for complete search history.

(56) References Cited

U.S. PATENT DOCUMENTS 12,094,474 B1 * 9/2024 Gowal ............... G10L 21/0232
2018/0254046 A1 9/2018 Khoury
(Continued)

OTHER PUBLICATIONS

Bharaj et al., U.S. Office Action dated Jun. 21, 2024, directed to U.S. Appl. No. 18/426,016; 7 pages.
(Continued)

*Primary Examiner* — Joseph Saunders, Jr.
(74) *Attorney, Agent, or Firm* — Morrison & Foerster LLP

(57) ABSTRACT

An exemplary method for detecting fake audios comprises: converting audio data into an image representation of the audio data; providing the image representation of the audio data to a trained machine-learning model, the machine learning model: generating, using a trained self-attention branch, one or more representation embeddings corresponding to the image representation of the audio data; and receiving, using a trained classifier component, the one or more representation embeddings and outputting a classification result. The machine-learning model is trained by: in a first stage, training one or more self- and cross-attention components via contrastive learning, each self- and cross-attention component comprises a first self-attention branch, a second self-attention branch, and a cross-attention branch; and in a second stage, training the classifier component; and providing the classification result.

17 Claims, 13 Drawing Sheets

(51) Int. Cl.
  *G06F 18/2415* (2023.01)
  *G10L 21/14* (2013.01)
  *G10L 25/18* (2013.01)
  *G10L 25/51* (2013.01)

(52) U.S. Cl.
  CPC .............. *G10L 25/18* (2013.01); *G10L 25/30* (2013.01); *G10L 25/51* (2013.01)

(56) References Cited

U.S. PATENT DOCUMENTS

| | | |
|---|---|---|
| 2021/0074305 A1 | 3/2021 | Gopala |
| 2022/0358934 A1 | 11/2022 | Wang |
| 2023/0086355 A1* | 3/2023 | Wichern ................ G06N 3/08 704/200 |
| 2023/0206925 A1 | 6/2023 | Havdan |
| 2023/0274758 A1 | 8/2023 | Markhasin |
| 2024/0089371 A1 | 3/2024 | Lohar |
| 2024/0127049 A1 | 4/2024 | Choudhury |

OTHER PUBLICATIONS

Goel et al. "Towards Attention-based Contrastive Learning for Audio Spoof Detection," Interspeech 2023, Aug. 20-24, 2023, Dublin, Ireland; 5 pages.

* cited by examiner

| Training policy | Augmentations | EER |
|---|---|---|
| Vanilla WCE | Mixup, SpecAugment, Noise | 19.48 |
| WCE-updated | WavAugment, Pitch Shift, Time Stretch, RawBoost, Narrowband FIR | 8.96 |
| SSAST-CL (Ours) (self-attention only) | WavAugment, Pitch Shift, Time Stretch, RawBoost, Narrowband FIR | 5.64 |
| SSAST-CL (Ours) (self and cross-attention, $\alpha = 0.2$) | WavAugment, Pitch Shift, Time Stretch, RawBoost, Narrowband FIR | 4.74 |

FIG. 8

| Model | DA | EER | Parameters (million) | GMACs[3] |
|---|---|---|---|---|
| Wave2Vec2.0+ AASiST [27] | RawBoost (On-the-fly) | 0.82 | 317.84 | 1050 |
| LCNN-LSTM [34] | RS Mixup + FIR (On-the-fly) | 2.21 | 0.5* | 21.77* |
| ResNet-LDE [36] | RIR+Background noise + Frequency Masking | 3.68 | 11.5* | 100.74* |
| SSAST-CL (Ours) | RawBoost + WavAugment + Pitch Shift + Time Stretch + Narrowband FIR (On-the-fly) | 4.74 | 5.99 | 126.75 |
| RawNet2 [33] | RawBoost (On-the-fly) | 5.31 | 25.43 | 59.45 |
| ResNet-34 [37] | Cellular, Telephony, and VoIP Codecs (Offline) | 5.18 | 21.5 | 623.89 |
| ASVSpoof21 B03 [7] | None | 9.26 | 0.27 | 10.75 |

FIG. 9

| Model | RawBoost | Narrowband FIR | EER |
|---|---|---|---|
| SSAST-CL (Ours) | ✗ | ✗ | 8.69 |
| | ✗ | ✓ | 6.88 |
| | ✓ | ✗ | 5.34 |
| | ✓ | ✓ | 4.74 |

FIG. 10

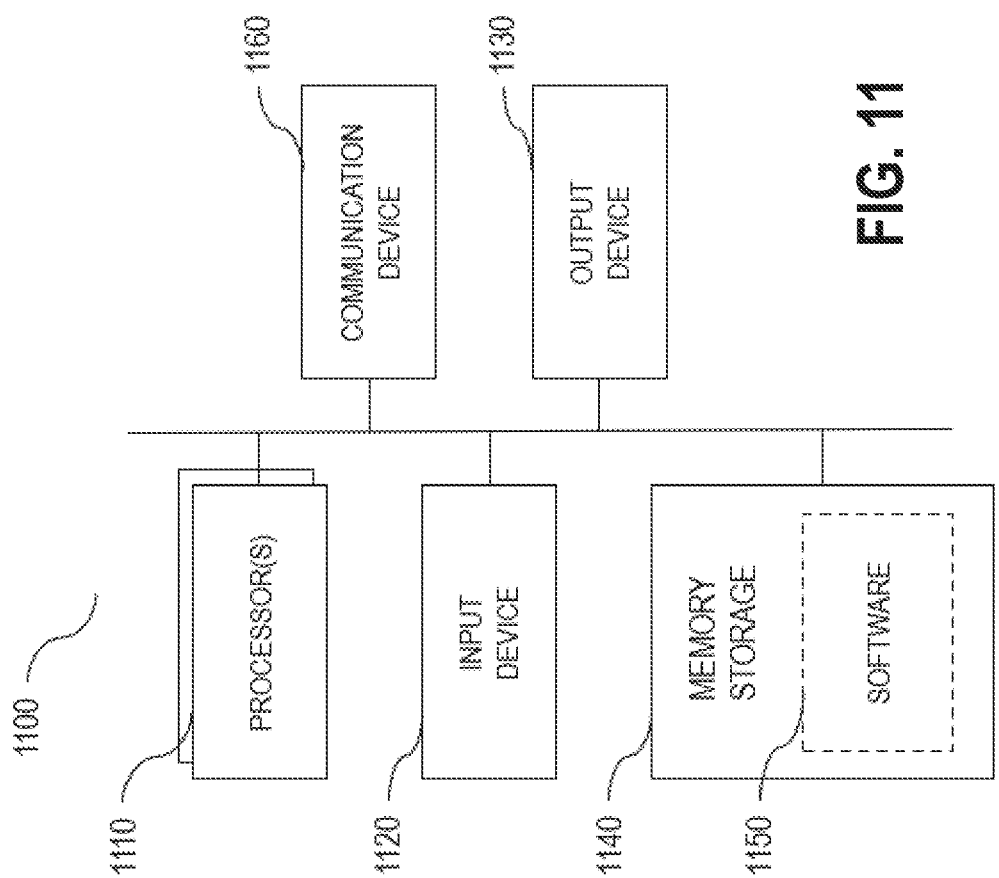

AUDIO SPOOF DETECTION USING ATTENTION-BASED CONTRASTIVE LEARNING

CROSS-REFERENCE TO RELATED APPLICATIONS

This application is a continuation of U.S. application Ser. No. 18/426,016, filed Jan. 29, 2024, the entire contents of which is incorporated herein by reference.

FIELD

The described embodiments relate to techniques for detecting fake audio content using a neural network. Notably, the described embodiments relate to techniques for detecting fake audio content using a neural network that includes attention-based contrastive learning.

BACKGROUND

Vision Transformers (ViTs) are machine-learning models that can, for example, process images for various classification tasks in computer vision. While ViTs have been used for audio analysis, they have not typically been used for audio spoof detection (i.e., the determination of whether an audio is fake or real).

The standard approach for training an audio ViT is to fine-tune a pretrained audio ViT for a given downstream classification task. Pre-training is done on a large dataset, and fine-tuning on a smaller task-specific dataset. However, this standard approach does not empirically work well for audio spoof detection and results in high equal error rate (EER). Pretraining on a large audio dataset is often required for audio ViTs to perform well. However, such bonafide-only datasets are not optimal as they do not contain spoof samples. In other words, spoof detection is an out-of-distribution downstream task.

Further, existing audio spoof models require a relatively large number of parameters. The large number of parameters means that a larger training dataset is required and significantly more resources (e.g., processors, memories) are needed for training the models and running the models. Further, many existing training and testing datasets for audio spoof detection are limited in volume and often contain data corrupted by codecs and transmission channel artifacts.

SUMMARY

Disclosed herein are systems, electronic devices, methods, and non-transitory storage media for detecting fake audios (e.g., the degree of realness, the degree of fakeness, a binary classification). The audio may contain speech, sound, or any combination thereof. An exemplary system (e.g., one or more electronic devices) can obtain an image representation of the audio (e.g., a spectrogram) and determining the realness of fakeness of the audio by providing the image representation of the audio to a trained machine-learning model. The trained machine-learning model comprises a trained self-attention branch for generating one or more representation embeddings corresponding to the image representation of the audio. The trained machine-learning model further comprises a trained classifier component for receiving the one or more representation embeddings and outputting a classification result of whether the audio is real or fake (e.g., a binary value, a probability value). The machine-learning model is trained in a two-stage process. In a first stage, the system trains one or more self- and cross-attention components via contrastive learning, each self- and cross-attention component comprises a first self-attention branch, a second self-attention branch, and a cross-attention branch. In a second stage, the system trains the classifier component.

Accordingly, embodiments of the present disclosure can leverage a two-stage contrastive learning framework to train an audio ViT for the spoof detection task. In the first stage, the system leverages Siamese training for representation learning and introduces a cross-attention branch into the training framework to learn discriminative representations for bonafide (i.e., real) and spoof (i.e., fake) classes. In the second stage, a classifier is trained to receive representation embedding(s) of an audio and output a classification result.

Embodiments of the present disclosure provides a number of technical advantages. The system uses a self-attention branch to generate representation embedding(s) of an audio and, during training, the self-attention branch is trained alongside with a cross-attention branch via contrastive learning in a novel way. A novel loss formulation measures the (dis-)similarity between the self and cross-attention representations to separate the real and fake classes. Experiments show that the trained self-attention branch can successfully disentangle the real and fake classes, even when trained with limited data. Specifically, the trained self-attention branch can generate representation embeddings such that representation embeddings of the same class are closer together and representation embeddings of different classes are further apart.

Thus, the classifier is able to be trained on smaller datasets, learn better classification margins, and are more robust to data corruptions. Experiments show that the classifier outperforms many existing audio spoof detection models. Further, the embodiments of the present disclosure use a significantly smaller parameters. Thus, embodiments of the present disclosure need a smaller training dataset. Significantly less resources (e.g., processors, memories, battery) are needed for training the models and running the models, thus improving the functioning of a computer system.

An exemplary method for detecting fake audios comprises: converting audio data into an image representation of the audio data; providing the image representation of the audio data to a trained machine-learning model, the machine learning model: generating, using a trained self-attention branch, one or more representation embeddings corresponding to the image representation of the audio data; and receiving, using a trained classifier component, the one or more representation embeddings and outputting a classification result; and wherein the machine-learning model is trained by: in a first stage, training one or more self- and cross-attention components via contrastive learning, each self- and cross-attention component comprises a first self-attention branch, a second self-attention branch, and a cross-attention branch; and in a second stage, training the classifier component; and providing the classification result.

In some embodiments, converting the audio data into the image representation of the audio data comprises: receiving audio waveforms; and converting the audio waveforms into a spectrogram.

In some embodiments, the classification result comprises a binary value or a probability value. In some embodiments, the audio is AI-generated.

In some embodiments, the one or more self- and cross-attention components are configured to: generate a first representation embedding corresponding to a first input corresponding to a first training audio, generate a second representation embedding corresponding to a second input corresponding to a second training audio, and generating a cross-attention representation embedding corresponding to both the first input and the second input. In some embodiments, a contrastive loss is calculated based on the first representation embedding, the second representation embedding, and the cross-attention representation embedding.

In some embodiments, training one or more self- and cross-attention components via contrastive learning comprises increasing the difference between representation embeddings of real audios and representation embeddings of fake audios.

In some embodiments, the first self-attention branch in each self- and cross-attention component is configured to generate a first query matrix, a first key matrix, and a first value matrix, the second self-attention branch in each self- and cross-attention component is configured to generate a second query matrix, a second key matrix, and a second value matrix, and the cross-attention branch in each self- and cross-attention component is configured to receive the first query matrix, the second key matrix, and the second value matrix.

In some embodiments, the first self-attention branch in each self- and cross-attention component comprises a first multi-head self-attention mechanism for processing the first query matrix, the first key matrix, and the first value matrix, the second self-attention branch in each self- and cross-attention component comprises a second multi-head self-attention mechanism for processing the second query matrix, the second key matrix, and the second value matrix, and the cross-attention branch in each self- and cross-attention component comprises a multi-head cross-attention mechanism for processing the first query matrix, the second key matrix, and the second value matrix.

In some embodiments, the trained machine-learning model further comprises: a trained patch split component for splitting the image representation of the audio into a sequence of image patches.

In some embodiments, the trained machine-learning model further comprises: a trained projection component for generating, based on the sequence of image patches, a plurality of embeddings for input into the trained self-attention branch.

An exemplary system for detecting fake audios comprises: one or more processors, a memory, and one or more programs, wherein the one or more programs are stored in the memory and configured to be executed by the one or more processors, the one or more programs including instructions for: converting audio data into an image representation of the audio data; providing the image representation of the audio data to a trained machine-learning model, the machine learning model: generating, using a trained self-attention branch, one or more representation embeddings corresponding to the image representation of the audio data; and receiving, using a trained classifier component, the one or more representation embeddings and outputting a classification result; and wherein the machine-learning model is trained by: in a first stage, training one or more self- and cross-attention components via contrastive learning, each self- and cross-attention component comprises a first self-attention branch, a second self-attention branch, and a cross-attention branch; and in a second stage, training the classifier component; and providing the classification result.

An exemplary non-transitory computer-readable storage medium stores one or more programs for detecting fake audios, the one or more programs comprising instructions, which when executed by one or more processors of an electronic device having a display, cause the electronic device to: convert audio data into an image representation of the audio data; provide the image representation of the audio data to a trained machine-learning model, the machine learning model: generating, using a trained self-attention branch, one or more representation embeddings corresponding to the image representation of the audio data; and receiving, using a trained classifier component, the one or more representation embeddings and outputting a classification result; and wherein the machine-learning model is trained by: in a first stage, training one or more self- and cross-attention components via contrastive learning, each self- and cross-attention component comprises a first self-attention branch, a second self-attention branch, and a cross-attention branch; and in a second stage, training the classifier component; and provide the classification result.

An exemplary method for training a machine-learning model to detect fake audios comprises: in a first stage, training one or more self- and cross-attention components of the machine-learning model via contrastive learning, each self- and cross-attention component comprises a first self-attention branch, a second self-attention branch, and a cross-attention branch; and in a second stage, training a classifier component of the machine-learning model, wherein the classifier is configured to receive one or more representation embeddings generated by a self-attention branch trained in the first stage and output a classification result.

In some embodiments, the one or more representation embeddings correspond to an image representation of audio data.

In some embodiments, the image presentation of the audio data is generated by: receiving audio waveforms; and converting the audio waveforms into a spectrogram.

In some embodiments, the classification result comprises a binary value or a probability value.

An exemplary system comprises: one or more processors, a memory, and one or more programs, wherein the one or more programs are stored in the memory and configured to be executed by the one or more processors, the one or more programs including instructions for: in a first stage, training one or more self- and cross-attention components of the machine-learning model via contrastive learning, each self- and cross-attention component comprises a first self-attention branch, a second self-attention branch, and a cross-attention branch; and in a second stage, training a classifier component of the machine-learning model, wherein the classifier is configured to receive one or more representation embeddings generated by a self-attention branch trained in the first stage and output a classification result.

An exemplary non-transitory computer-readable storage medium stores one or more programs, the one or more programs comprising instructions, which when executed by one or more processors of an electronic device having a display, cause the electronic device to: in a first stage, train one or more self- and cross-attention components of the machine-learning model via contrastive learning, each self- and cross-attention component comprises a first self-attention branch, a second self-attention branch, and a cross-attention branch; and in a second stage, train a classifier component of the machine-learning model, wherein the classifier is configured to receive one or more representation embeddings generated by a self-attention branch trained in the first stage and output a classification result.

BRIEF DESCRIPTION OF THE FIGURES

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 8 shows exemplary performance data in accordance with some embodiments of the present disclosure.

FIG. 9 shows exemplary performance data in accordance with some embodiments of the present disclosure.

FIG. 10 shows ablation over data augmentation combinations for the proposed SSAST-CL framework in accordance with some embodiments of the present disclosure.

FIG. 11 illustrates an exemplary electronic device in accordance with some embodiments of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
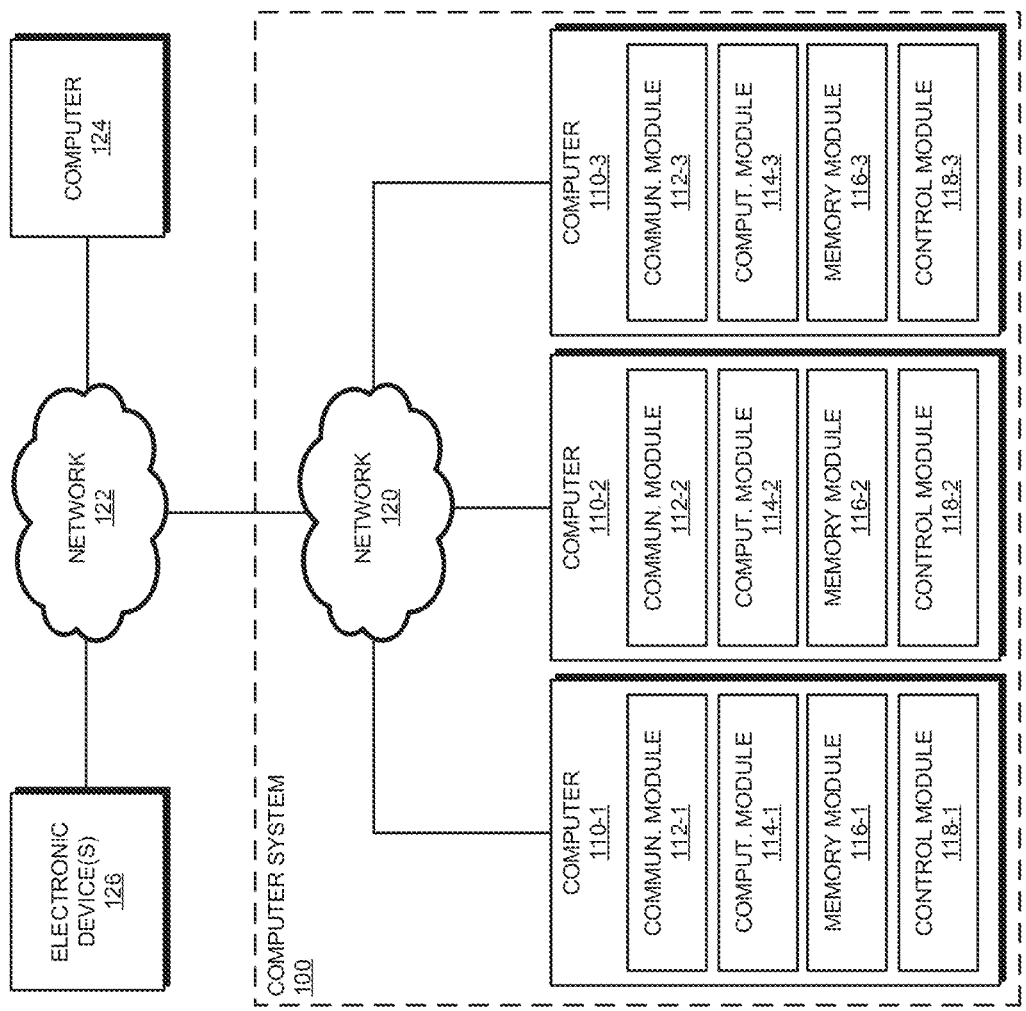
FIG. 1 is a block diagram illustrating an example of a computer system that trains and uses an artificial neural network in accordance with some embodiments of the present disclosure.

Disclosed herein are systems, electronic devices, methods, and non-transitory storage media for detecting fake audios (e.g., the degree of realness, the degree of fakeness, a binary classification). The audio may contain speech, sound, or any combination thereof. An exemplary system (e.g., one or more electronic devices) can obtain an image representation of the audio (e.g., a spectrogram) and determining the realness of fakeness of the audio by providing the image representation of the audio to a trained machine-learning model. The trained machine-learning model comprises a trained self-attention branch for generating one or more representation embeddings corresponding to the image representation of the audio. The trained machine-learning model further comprises a trained classifier component for receiving the one or more representation embeddings and outputting a classification result of whether the audio is real or fake (e.g., a binary value, a probability value). The machine-learning model is trained in a two-stage process. In a first stage, the system trains one or more self- and cross-attention components via contrastive learning, each self- and cross-attention component comprises a first self-attention branch, a second self-attention branch, and a cross-attention branch. In a second stage, the system trains the classifier component.

Accordingly, embodiments of the present disclosure can leverage a two-stage contrastive learning framework to train an audio ViT for the spoof detection task. In the first stage, the system leverages Siamese training for representation learning and introduces a cross-attention branch into the training framework to learn discriminative representations for bonafide (i.e., real) and spoof (i.e., fake) classes. In the second stage, a classifier is trained to receive representation embedding(s) of an audio and output a classification result.

Embodiments of the present disclosure provides a number of technical advantages. The system uses a self-attention branch to generate representation embedding(s) of an audio and, during training, the self-attention branch is trained alongside with a cross-attention branch via contrastive learning in a novel way. A novel loss formulation measures the (dis-)similarity between the self and cross-attention representations to separate the real and fake classes. Experiments show that the trained self-attention branch can successfully disentangle the real and fake classes, even when trained with limited data. Specifically, the trained self-attention branch can generate representation embeddings such that representation embeddings of the same class are closer together and representation embeddings of different classes are further apart.

Thus, the classifier is able to be trained on smaller datasets, learn better classification margins, and are more robust to data corruptions. Experiments show that the classifier outperforms many existing audio spoof detection models. Further, the embodiments of the present disclosure use a significantly smaller parameters. Thus, embodiments of the present disclosure need a smaller training dataset. Significantly less resources (e.g., processors, memories, battery) are needed for training the models and running the models, thus improving the functioning of a computer system.

FIG. 1 presents a block diagram illustrating an example of a computer system 100. This computer system may include one or more computers 110. These computers may include: communication modules 112, computation modules 114, memory modules 116, and optional control modules 118. Note that a given module or engine may be implemented in hardware and/or in software.

Communication modules 112 may communicate frames or packets with data or information (such as information specifying a neural network or control instructions) between computers 110 via a network 120 (such as the Internet and/or an intranet). For example, this communication may use a wired communication protocol, such as an Institute of Electrical and Electronics Engineers (IEEE) 802.3 standard (which is sometimes referred to as 'Ethernet') and/or another type of wired interface. Alternatively or additionally, communication modules 112 may communicate the data or the information using a wireless communication protocol, such as: an IEEE 802.11 standard (which is sometimes referred to as 'Wi-Fi', from the Wi-Fi Alliance of Austin, Texas), Bluetooth (from the Bluetooth Special Interest Group of Kirkland, Washington), a third generation or 3G communication protocol, a fourth generation or 4G communication protocol, e.g., Long Term Evolution or LTE (from the 3rd Generation Partnership Project of Sophia Antipolis, Valbonne, France), LTE Advanced (LTE-A), a fifth generation or 5G communication protocol, other present or future developed advanced cellular communication protocol, or another type of wireless interface. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, IEEE 802.11me, IEEE 802.11bi, IEEE 802.11bn, IEEE 802.11UHR, or other present or future developed IEEE 802.11 technologies.

In the described embodiments, processing a packet or a frame in a given one of computers 110 (such as computer 110-1) may include: receiving the signals with a packet or the frame; decoding/extracting the packet or the frame from the received signals to acquire the packet or the frame; and processing the packet or the frame to determine information contained in the payload of the packet or the frame. Note that the communication in FIG. 1 may be characterized by a variety of performance metrics, such as: a data rate for successful communication (which is sometimes referred to as 'throughput'), an error rate (such as a retry or resend rate), a mean squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). Note that wireless communication between components in FIG. 1 uses one or more bands of frequencies, such as: 900 MHZ, 2.4 GHz, 5 GHZ, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. In some embodiments, the communication between the components may use multi-user transmission, such as multiple input multiple output (MIMO) and/or orthogonal frequency division multiple access (OFDMA).

Moreover, computation modules 114 may perform calculations using: one or more microprocessors, ASICs, microcontrollers, programmable-logic devices, GPUs and/or one or more digital signal processors (DSPs). Note that a given computation component is sometimes referred to as a 'computation device'.

Furthermore, memory modules 116 may access stored data or information in memory that local in computer system 100 and/or that is remotely located from computer system 100. Notably, in some embodiments, one or more of memory modules 116 may access stored information in the local memory, such as information specifying a neural network. Alternatively or additionally, in other embodiments, one or more memory modules 116 may access, via one or more communication modules 112, stored information in remote memory in computer 124, e.g., via network 120 and network 122. Note that network 122 may include: the Internet and/or an intranet. In some embodiments, the information is received from one of electronic devices 126 via network 120 and network 122 and one or more of communication modules 112. Thus, in some embodiments at least some of the information may have been received previously and may be stored in memory, while in other embodiments at least some of the information may be received in real-time from computer 124 or one of electronic devices 126.

While FIG. 1 illustrates computer system 100 at a particular location, in other embodiments at least a portion of computer system 100 is implemented at more than one location. Thus, in some embodiments, computer system 100 is implemented in a centralized manner, while in other embodiments at least a portion of computer system 100 is implemented in a distributed manner.

Moreover, in some embodiments, the one or more electronic devices 126 may include local hardware and/or software that performs at least some of the operations in the computational techniques. Furthermore, a given one of electronic devices 126 may execute the artificial neural network (such as using one or more processors and/or one or more GPUs). In some embodiments, at least some of the operations in the computational techniques may be implemented using program instructions or software that are executed in an environment on one of electronic devices 126, such as: an application executed in the operating system of one of electronic devices 126, as a plugin for a Web browser or an application tool that is embedded in a web page and that executes in a virtual environment of the Web browser (e.g., in a client-server architecture), etc. Note that the software may be a standalone application or a portion of another application that is resident on and that executes on one of electronic devices 126 (such as a software application that is provided by the one of electronic devices 126 or that is installed on and that executes on the one of electronic devices 126). Consequently, the computational techniques may be implemented locally and/or remotely, and may be implemented in a distributed or a centralized manner.

Although we describe the computing environment shown in FIG. 1 as an example, in alternative embodiments, different numbers or types of components or electronic devices may be present. For example, some embodiments comprise more or fewer components, a different component, components may be combined into a single component, and/or a single component may be divided into two or more components. As another example, in another embodiment, different components perform at least some of the operations in the computational techniques.

As discussed previously, it is often challenging to assess whether audio content is real or fake. Moreover, as described further below with reference to FIGS. 2-7, in order to address these challenges computer system 100 may perform the computational techniques. Notably, during the computational techniques, one or more of optional control modules 118 may divide the training and/or the analysis among computers 110. Then, a given computer (such as computer 110-1) may perform at least a designated portion of the training and/or the analysis. Notably, computation module 114-1 may obtain (e.g., access) information (e.g., from memory module 116-1 or computer 124) specifying an initial artificial neural network. Then, computation module 114-1 may perform operations in the computational techniques.

For example, as described further below with reference to FIGS. 2-7, computation module 114-1 may train an artificial neural network (such as a transformer) having a dynamically varying loss function that models contrastive learning, where the dynamically varying loss function has cross-attention and self-attention, and where the dynamically varying loss function includes contrastive loss in which a sample distribution and a query distribution associated with real audio content are spatially closer together and a second sample distribution and a second query distribution associated with fake audio content are spatially further apart. Note that self-attention includes a given sample distribution and a given query distribution from a same activation class (such as real or fake) and cross-attention includes the given sample distribution and the given query distribution from different activation classes. Moreover, note that the sample distribution may include key-value pairs associated with the real audio content or the fake audio content. Furthermore, the dynamically varying loss function may be computed using a dot or inner product.

In the present discussion, note that a 'query' may include or correspond to 'one or more words or tokens', which is sometimes referred to as a 'word vector' or 'embedding.' Furthermore, a 'key' should be understood to be an 'identifier' (such as a unique identifier) and a 'value' should be understood to be a 'numerical value or weight' associated with a corresponding key. Therefore, note that the query distribution may correspond to input words or tokens in the real audio content, the second query distribution may correspond to second input words or second tokens in the fake audio content, the key distribution may include identifiers and/or associated numerical values in the real audio content, and the second key distribution may include second identifiers and/or associated second numerical values in the fake audio content.

Then, when a training termination criterion is achieved, computation module 114-1 may deem the artificial neural network to be a trained artificial neural network and may cease training of the trained artificial neural network. Next, using the trained artificial neural network, computation module 114-1 may assesses whether additional audio content is real or fake, where, during the assessment, the trained artificial neural network generates embeddings associated with the additional audio content and classifies the embeddings as real or fake (e.g., by outputting a binary value or a continuous value) using a self-attentive loss function. In some embodiments, the assessment may include use of a perceptron. Note that this perceptron may be adapted during the assessment.

After training and/or assessing the additional audio content using the artificial neural network in the computational techniques, computation module 114-1 may output or provide information specifying the trained artificial neural network. Then, the one or more of optional control modules 118 may instruct one or more of communication modules 114 (such as communication module 114-1) to provide, via network 120 and 122, the information to, e.g., computer 124 or one or more of electronic devices 126. Alternatively or additionally, the one or more of optional control modules 118 may instruct one or more of computation modules 114-1 (such as computation module 114-1) to store the information in one or more of memory modules 116 (such as memory module 116-1).

In these ways, computer system 100 may automatically train the artificial neural network to more accurately assess whether audio content is real or fake. Notably, the computational techniques may use cross-attention to aid representation learning. Consequently, the trained artificial neural network may have improved EERs, even for smaller training datasets and/or training datasets that are corrupted by codecs and transmission channel artifacts. Therefore, the trained artificial neural network may improve the user experience when using the trained artificial neural network to assess whether audio content is real or fake. This may significantly reduce the cost and complexity of the compute environment in computer system 100 and/or electronic devices 126. In addition, computer system 100 may not need to have specialized (and expensive) processing capabilities and/or specialized training datasets to perform the computational techniques.

While the preceding discussion illustrated the computational techniques with the artificial neural network, in other embodiments the computational techniques may be used with a different type of neural network. For example, the different type of neural network may have: a different number of layers, a different number of filters or nodes, a different type of activation function, and/or a different architecture from the artificial neural network. In some embodiments, the type of neural network may include or combine one or more convolutional layers, one or more residual layers and one or more dense or fully connected layers. Moreover, a given node or filter in a given layer in the type of neural network may include an activation function, such as: a rectified linear activation function (ReLU), a leaky ReLU, an exponential linear unit (ELU) activation function, a parametric ReLU, a tanh activation function, and/or a sigmoid activation function.

Moreover, while the preceding discussion illustrated the use of the trained artificial neural network to assess whether audio content is real or fake, in other embodiments the computational techniques may be used to train an artificial neural network to perform language identification and/or acoustic scene classification.

Figure 2:
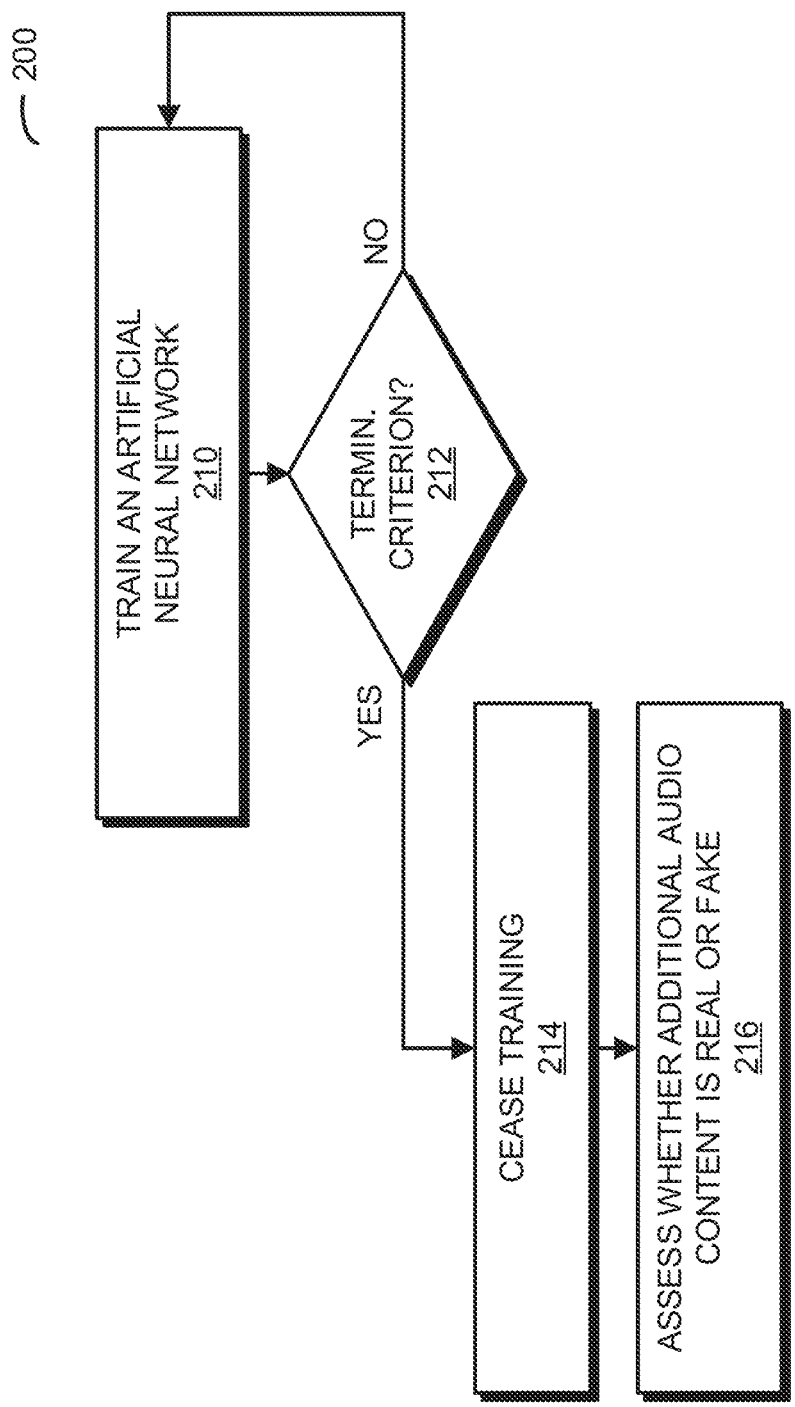
FIG. 2 is a flow diagram illustrating an example of a method for identifying fake or real audio content using an artificial neural network in accordance with some embodiments of the present disclosure.

We now further describe the computational techniques. FIG. 2 presents embodiments of a flow diagram illustrating an example of a method 200 for assessing whether additional audio content is real or fake, which may be performed by a computer system (such as at least a computer in computer system 100 in FIG. 1). Notably, the computer may include a computation device that performs method 200. For example, the computation device may include one or more of: a processor, one or more cores in a second processor, or another type of device that performs computation (such as one or more GPUs).

During operation, the computer system may train an artificial neural network (operation 210) having a dynamically varying loss function that models contrastive learning, where the dynamically varying loss function has cross-attention and self-attention, and where the dynamically varying loss function includes contrastive loss in which a sample distribution and a query distribution associated with real audio content are spatially closer together and a second sample distribution and a second query distribution associated with fake audio content are spatially further apart. Note that self-attention includes a given sample distribution and a given query distribution from a same activation class (such as real or fake) and cross-attention includes the given sample distribution and the given query distribution from different activation classes. Moreover, the sample distribution may include key-value pairs associated with the real audio content or the fake audio content. Furthermore, the dynamically varying loss function may be computed using a dot or inner product.

Then, when a training termination criterion is achieved (operation 212), the computer system may deem the artificial neural network to be a trained artificial neural network and may cease training of the trained artificial neural network (operations 214). Otherwise (operation 212), the computer system may continue to train the artificial neural network (operation 210). Next, using the trained artificial neural network, the computer system may assess whether additional audio content is real or fake (operation 216), where, during the assessment, the trained artificial neural network generates embeddings associated with the additional audio content and classifies the embeddings as real or fake using a self-attentive loss function.

Note that the artificial neural network and the trained artificial neural network may include a transformer.

Moreover, the query distribution may correspond to input words or tokens in the real audio content, the second query distribution may correspond to second input words or second tokens in the fake audio content, the key distribution may include identifiers and/or associated numerical values in the real audio content, and the second key distribution may include second identifiers and/or associated second numerical values in the fake audio content.

In some embodiments, the assessment (operation 216) may include use of a perceptron. This perceptron may be adapted during the assessment.

In some embodiments of method 200, there may be additional or fewer operations. Furthermore, there may be different operations. Moreover, the order of the operations may be changed, and/or two or more operations may be combined into a single operation.

Figure 3:
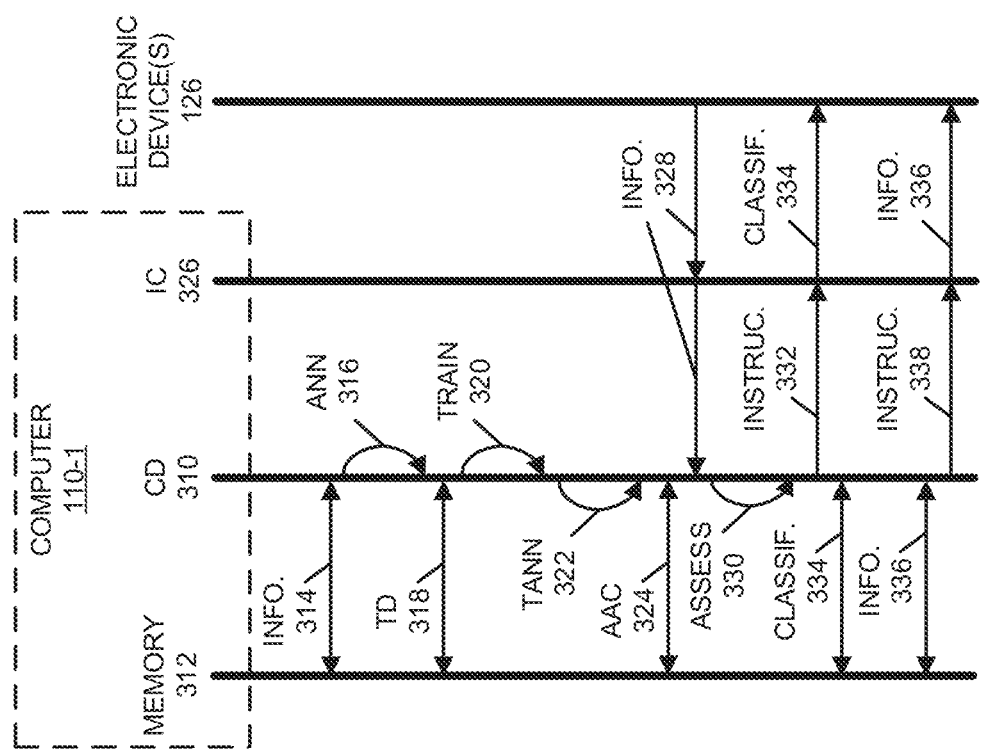
FIG. 3 is a drawing illustrating an example of communication among components in a computer system in FIG. 1 in accordance with some embodiments of the present disclosure.

Embodiments of the computational techniques are further illustrated in FIG. 3, which presents a drawing illustrating an example of communication among components in computer system 100 (FIG. 1). Notably, during the computational techniques, a computation device (CD) 310 (such as a processor or a GPU) in computer 110-1 may access, in memory 312 in computer 110-1, information 314 specifying configuration instructions and hyperparameters for an initial artificial neural network. Using information 314, computation device 310 may implement the artificial neural network (ANN) 316.

After implementing artificial neural network 316, computation device 310 may access a training dataset (TD) 318 in memory 312. Using the training dataset 318, computation device 310 may train 320 artificial neural network 316 having a dynamically varying loss function that models contrastive learning. During the training 320, weights associated with nodes in artificial neural network 316 may be adapted. Note that the dynamically varying loss function may have cross-attention and self-attention, and the dynamically varying loss function may include contrastive loss in which a sample distribution and a query distribution associated with real audio content are spatially closer together and a second sample distribution and a second query distribution associated with fake audio content are spatially further apart.

When a training termination criterion is achieved, computation device 310 may deem artificial neural network 316 to be a trained artificial neural network (TANN) 322 and may cease training of the trained artificial neural network.

Next, computation device 310 may access additional audio content (AAC) 324 stored in memory 312. Alternatively or additionally, interface circuit (IC) 326 in computer 110-1 may receive information 328 specifying additional audio content 324 (such as a mel spectrum or mel spectrogram, which is sometimes referred to as a mel-frequency cepstrum), e.g., from one of the one or more electronic devices 126. After receiving information 328, interface circuit 326 may provide information 328 to computation device 310.

Using trained artificial neural network 322, computation device 310 may assess 330 whether additional audio content 324 is real or fake, where, during the assessment, trained artificial neural network 322 may generate embeddings associated with additional audio content 324 and may classify the embeddings as real or fake using a self-attentive loss function.

In some embodiments, computation device 310 may instruct 332 interface circuit 326 to report a classification 334 (e.g., real or fake) 330 of additional audio content 324 to the one of the one or more electronic devices 126. Alternatively or additionally, computation device 310 may store classification 334 in memory 312.

Furthermore, after or while performing the operations in the computation techniques, computation device 310 may store results, including information 336 specifying trained artificial neural network 322, in memory 312. In some embodiments, computation device 310 may provide instructions 338 to interface circuit 326 to provide information 336 to another computer or electronic device, such as one of the one or more electronic devices 126.

While FIG. 3 illustrates communication between components using unidirectional or bidirectional communication with lines having single arrows or double arrows, in general the communication in a given operation in this figure may involve unidirectional or bidirectional communication.

We now further describe the computational techniques. These computational techniques may be used to train an artificial neural network to assess whether audio content is real or fake. The artificial neural network may include a ViT for audio spoof detection. Notably, the artificial neural network may include an attention-based contrastive learning framework (SSAST-CL) that uses cross-attention to aid the representation learning. This framework may successfully disentangle bonafide (or real) and spoof (or fake) classes and may help learn better classifiers for the task. With an appropriate data augmentations policy, an artificial neural network trained using this framework may provide competitive performance on the Automatic Speaker Verification and Spoofing Countermeasures (ASVspoof) 2021 challenge.

The disclosed framework used in the computational techniques may include a contrastive learning approach. Notably, a cross-attention branch may be included into the training framework. In addition, the disclosed framework may include a loss formulation that measures the (dis-)similarity between the self- and cross-attention representations to separate the real and fake classes. The disclosed attention-based CL framework, with appropriate data augmentations, may be able to learn discriminative representations that disentangle the real samples from the fake ones. Furthermore, the computational techniques may provide a significant gain in performance over the baseline cross-entropy classifier.

In summary, the computational techniques may include a two-stage contrastive learning framework to train an audio ViT for the spoof detection task. Moreover, the computational techniques may include Siamese training for representation learning and may introduce a cross-attention branch into the training framework to learn discriminative representations for real and fake classes. These approaches may provide a suitable loss function. Furthermore, in the computational techniques, a multi-layer perceptron (MLP) trained on the learned representations may outperform the ASVSpoof 2021 challenge baselines and may compete with or exceed the best-performing models.

In some embodiments of the computational techniques, an audio ViT may learn efficient representations for the spoof detection task. This audio ViT may include a self-supervised audio spectrogram transformer (SSAST) that is pretrained on the AudioSet and LibriSpeech datasets. Moreover, the computational techniques may use a contrastive learning-based two-stage training framework.

Figure 4A:
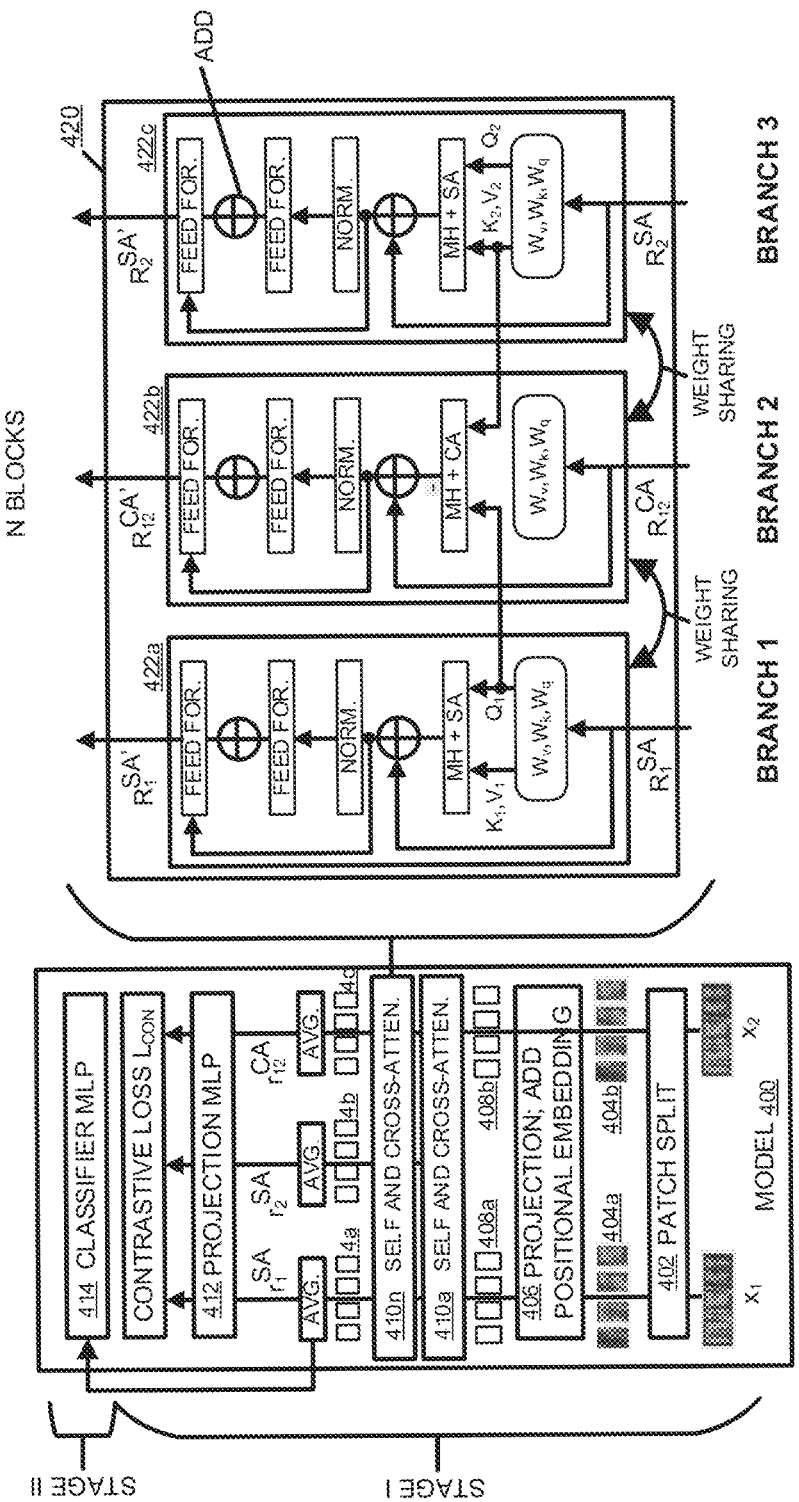
FIG. 4A illustrates an exemplary a two-stage contrastive learning framework to train an artificial neural network for audio spoof detection in accordance with some embodiments of the present disclosure.

FIG. 4A illustrates an example of a two-stage contrastive learning framework to train a machine-learning model for audio spoof detection. In some embodiments, the machine-learning model comprises a SSAST model and the framework can be referred to as an SSAST-CL framework.

With reference to FIG. 4A, an exemplary model 400 comprises a backbone comprising a patch split component 402, a projection component 406, a plurality of self- and cross-attention components 410a-410n, a plurality of averaging components, and a projection multilayer perceptron (MLP) component 412. In some embodiments, the backbone is an SSAST backbone. In Stage I, the backbone of the model 400 is trained via contrastive learning in a Siamese manner in order to learn discriminative representations (e.g., embeddings) for the real and fake classes, as described below in detail. Siamese training may include weight-sharing across two multi-head self-attention (MH+SA) and one multi-head cross-attention (MH+CA) branches. Model weights may be learned using a contrastive loss that measures the (dis-)similarity between the self- and cross-attention representations ($r_1^{SA}$, $r_2^{SA}$, $r^{CA}$).

In Stage II, a classifier MLP 414 is added and configured to receive a representation generated by the backbone and classify the representation as real or fake (e.g., including the degree of realness or fakeness). In Stage II, the classifier MLP 414 is trained. An MLP refers to a feedforward artificial neural network, comprising fully connected neurons organized in a plurality of layers.

Stage I: Representation Learning

With reference to FIG. 4A, an exemplary model 400 comprises a backbone comprising a patch split component 402, a projection component 406, a plurality of self- and cross-attention components 410a-410n, a plurality of averaging components, and a projection MLP component 412. The backbone is configured to receive input data representing audio data (a spectrogram of audio waveforms) and output a representation of the input data. In some embodiments, the representation of the input data is an embedding, which is a vector representation of the input data in a continuous vector space. In the depicted example, during Stage I, the backbone of the model 400 is configured to receive two inputs ($x_1$, $x_2$) and output a representation $r_1^{SA}$ corresponding to the input $x_1$, a representation $r_2^{SA}$ corresponding to the input $x_2$, and an aggregate representation $r_{12}^{CA}$ for the input pair ($x_1$, $x_2$). A contrastive loss is calculated based on the representations and the model backbone is updated accordingly based on the contrastive loss. Specifically, in Stage I, the goal is to train the model backbone to generate discriminative representations for the real (i.e., bonafide) and fake (i.e., spoof) classes. In other words, the goal is to train the model to have real audio inputs mapped close to each other (i.e., the corresponding embeddings are relatively close to each other in the vector space), fake audio inputs mapped close to each other (i.e., the corresponding embeddings are relatively close to each other in the vector space), while dissimilar items are farther apart (i.e., the embeddings corresponding to real audio inputs are farther apart from the embeddings corresponding to the fake audio inputs).

With reference to FIG. 4A, the backbone receives a pair of data ($x_1$, $x_2$) as input. In some embodiments, each input is an image representation (e.g., spectrogram) of an original audio data (e.g., audio waveforms). Each input may be either real or fake. Accordingly, the pair of input data ($x_1$, $x_2$) may represent a pair of real and fake audios, a pair of fake and real audios, a pair of fake audios, or a pair of real audios.

The patch split component 402 can split each input into a sequence of image patches. In the depicted example, the patch split component 402 can generate a sequence of image patches 404a based on the spectrogram input $x_1$ and generate a sequence of image patches 404b based on the spectrogram input $x_2$.

The projection component 406 can transform a sequence of image patches into a sequence of embeddings and add a positional embedding to each embedding to encode the place of the embedding in the sequence. In the depicted example, the projection component 406 can receive the sequence of image patches 404a and output a sequence of embeddings 408a and receive the sequence of image patches 404b and output a sequence of embeddings 408b.

The model backbone then provides a plurality of self- and cross-attention components. With reference to FIG. 4A, the plurality of self- and cross-attention components comprise a self- and cross-attention component 410a, ..., and a self- and cross-attention component 410n. In some embodiments, the model backbone can comprise 12 self- and cross-attention components in total. An example of a single self- and cross-attention component is shown to the right of FIG. 4A.

A self- and cross-attention component can comprise three branches. Weights can be shared across the three branches. The first branch 422a can receive an input $r_1^{SA}$ and use self-attention to compute representation $r_1^{SA\prime}$ from the input. For the first self- and cross-attention component 410a, the input $r_1^{SA}$ is $x_1$; for the rest of the self- and cross-attention components, the input $r_1^{SA}$ is the output of the previous self and across-attention component. Similarly, the third branch 422c can receive an input $r_2^{SA}$ and use self-attention to compute representation $r_2^{SA\prime}$ from the input. For the first self- and cross-attention component 410a, the input $r_2^{SA}$ is $x_2$; for the rest of the self- and cross-attention components, the input $r_2^{SA}$ is the output of the previous self and across-attention component. Unlike the first branch 422a and the third branch 422c, the second branch 422b can use cross-attention to compute an aggregate representation $r_{12}^{CA}$ for the input pair.

In Stage I, three-branch Siamese training is performed. The first branch 422a, (i.e., the self-attention branch for $x_1$) receives the input $r_1^{SA}$. In the first branch 422a, key and value matrices ($Q_1$, ($K_1$, $V_1$)) are obtained from the input $r_1^{SA}$. The first branch 422a comprises a plurality of transformer components, including a multi-head self-attention (MH+SA) mechanism, to encode the intermediate representations $R_1^{SA\prime}$ using the query, key and value matrices ($Q_1$, ($K_1$, $V_1$)) from the first branch 422a.

As background, Q (i.e., queries), K (i.e., keys), and V (i.e., values) are inputs into the MH+SA mechanism. Queries can include a set of vectors to calculate attention for. Keys is a set of vectors to calculate attention against. As a result of dot product multiplication, the system obtains a set of weights (also vectors) showing how attended each query against Keys. The system then multiplies it by Values to obtain the resulting set of vectors. Additional details of cross-attention mechanism can be found in Ashish Vaswani et al., Attention is All You Need, Neural Information Processing Systems (2017).

Similarly, the third branch 422c, (i.e., the self-attention branch for $x_2$) receives the input $r_2^{SA}$. In the third branch 422c, key and value matrices ($Q_2$, ($K_2$, $V_2$)) are obtained from the input $r_2^{SA}$. The third branch 422c comprises a plurality of transformer components, including a multi-head self-attention (MH+SA) mechanism, to encode the intermediate representations $R_2^{SA'}$ using the query, key and value matrices ($Q_2$, ($K_2$, $V_2$)) from the third branch 422c.

Unlike the first branch 422a and the third branch 422c, the second branch 422b (i.e., the cross-attention branch) comprises a plurality of transformer components, including multi-head cross-attention (MH+CA) components to encode the intermediate representations $R_{12}^{CA'}$ using the query $Q_1$ from the $x_1$ branch and key-value matrices ($K_2$, $V_2$) from the $x_2$ branch. Using this design, the representation $r_{12}^{CA}$ may become an aggregate representation of the input pair because it captures the information in $x_2$ that is relevant to $x_1$.

When computing the attention matrices in the transformer components, the query, key, and value may be assigned learnable weights $W_q$, $W_k$, and $W_v$, respectively. These weights may be shared across the three branches. In some embodiments, the weights for the NORM layers and the FEED FOR layers are shared across the three branches 422a, 422b, 422c.

According, each self- and cross-attention component outputs attention-based intermediate representations ($r_1^{SA'}$, $r_2^{SA'}$, $r_{12}^{CA}$). These representations are then provided as input to the next se and cross-attention component. The outputs of the last self- and cross-attention component $r_1^{SA'}$ (shown as 4a), $r_2^{SA'}$ (shown as 4b), and $r_{12}^{CA'}$ (shown as 4c) is each averaged to obtain the attention-based representations ($r_1^{SA}$, $r_2^{SA}$, $r_{12}^{CA}$). In some embodiments, each branch yields a single one-dimensional embedding. With reference to FIG. 4A, a linear projection MLP component 412 can upsample the attention-based representations ($r_1^{SA}$, $r_2^{SA}$, $r_{12}^{CA}$) for the contrastive loss calculations.

During training, the model weights may be adapted or optimized using a contrastive loss formulation that measures the (dis-)similarity between the self- and cross-attention representations in order to separate the real and fake classes. Furthermore, a cosine distance metric, given by $$\cos(a, b) = \frac{a^T b}{\max(\|a\| \cdot \|b\|, \varepsilon)},$$

where $\varepsilon > 0$, may be used to measure the similarity between the representations. Note that similarity may be measured after feeding the representations $r^{SA}$, $r^{SA}$, $r^{CA}$ through the projection MLP (as shown in FIG. 4A).

The contrastive loss $L_{con}$ may be defined as $$L_{con} = L_{SA} + \alpha L_{CA}, \text{ where} \tag{1}$$

$$L_{SA} = -1 \begin{cases} \log(\cos(r_1^{SA}, r_2^{SA})), & c(x_1) = c(x_2) \\ \log(1 - \cos(r_1^{SA}, r_2^{SA})), & c(x_1) \neq c(x_2) \end{cases},$$

$$L_{CA} = -1 \begin{cases} \log(\cos(r_1^{SA}, r_{12}^{CA})), & c(x_1) = c(x_2) \\ \log(1 - \cos(r_1^{SA}, r_{12}^{CA})), & c(x_1) \neq c(x_2) \end{cases}.$$

In Eqn. (1), $c(x_1)$ and $c(x_2)$ are the (real or fake) classes to which $x_1$ and $x_2$ belong, $L_{SA}$ denotes the self-attention loss, $L_{CA}$ denotes the cross-attention loss, and $\alpha \in [0, 1]$ is a weighting parameter. The self-attention loss $L_{SA}$ may operate on representations $r_1^{SA}$ and $r_2^{SA}$ from the self-attention branches. It may maximize the similarity between $r_1^{SA}$ and $r_2^{SA}$ when the input pair ($x_1$, $x_2$) belong to the same class, and maximize their dissimilarity when the input pair belong to different classes. Moreover, the cross-attention loss $L_{CA}$ may operate on the self- and cross-attention representation pair ($r_1^{SA}$, $r_{12}^{CA}$), because they may have the same query $Q_1$ for each transformer component. $L_{CA}$ may maximize the similarity between $r_1^{SA}$ and its cross-attention counterpart $r_{12}^{CA}$ when the input pair ($x_1$, $x_2$) belongs to the same class, and their dissimilarity otherwise. While the self-attention loss term may direct the model to learn representations that separate the sample classes, the cross-attention loss term may serve as a regularizer by pushing the class-specific representations away from the aggregate representations computed by the cross-attention branch.

Note that a traditional Siamese training network may only compute the self-attention representations $r_1^{SA}$ and $r_2^{SA}$ and may measure their (dis-)similarity to separate the real and fake classes. In the embodiment shown in FIG. 4A, an additional cross-attention branch is included in the training framework in order to help the model learn more discriminative representations. After the training is completed, the projection MLP at the end of Stage I may be discarded.

Stage II: Classifier

The final classifier can include the trained patch split component 402, the trained projection component 406, a self-attention branch (e.g., the first branch 422a, the third branch 422c) in one or more of self- and cross-attention components 410a-n, and a classifier MLP 414. The final classifier is configured to receive an input spectrogram representing audio data and output a classification of whether the audio data is real or fake (e.g., a binary value, a probability value).

During Stage II, the final classifier is trained. Specifically, the model backbone, which has been trained in Stage I, can remain fixed. Specifically, the weights of the trained patch split component 402, the trained projection component 406, and the self-attention branch can remain frozen after Stage I. Further, in Stage II, the classifier MLP 424 may be trained using weighted cross-entropy to classify the representations from Stage I as real or fake (e.g., a binary value, a probability value).

Inference

Figure 4B:
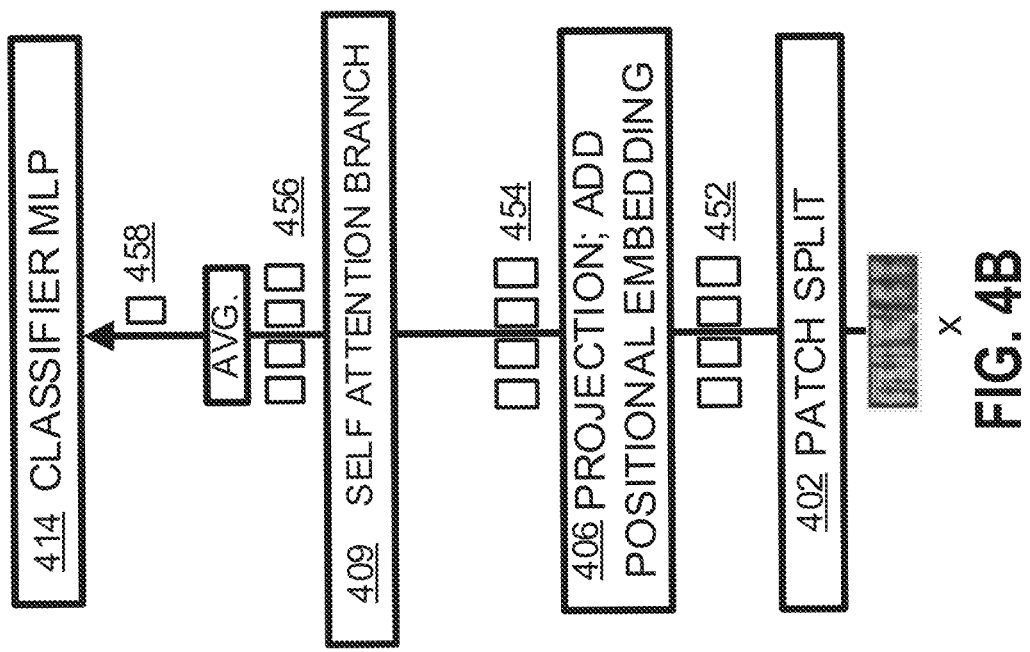
FIG. 4B illustrates an exemplary trained classifier in accordance with some embodiments of the present disclosure.

After the training of Stage II, the final classifier can be used to receive any input spectrogram representing audio data and classify the audio data as real or fake (e.g., a binary value, a probability value). FIG. 4B depicts an exemplary trained final classifier. With reference to FIG. 4B, the final classifier receives input data x. In some embodiments, the input data is an image representation (e.g., spectrogram) of an original audio data (e.g., audio waveforms). The original audio data may be either real or fake.

The patch split component 402 can split the input data x into a sequence of image patches. In the depicted example, the patch split component 402 can generate a sequence of image patches 452 based on the spectrogram input x.

The projection component 406 can transform a sequence of image patches into a sequence of embeddings (e.g., by generating an embedding for each image patch) and add a positional embedding to each embedding to encode the place of the embedding in the sequence. In the depicted example, the projection component 406 can receive the sequence of image patches 452 and output a sequence of embeddings 454.

The self-attention branch 409 can receive the sequence of embeddings 545 and compute the representation embeddings 456. As described above, the self-attention branch 409 may be from any of the first branch 422a or the third branch 422c of any self- and cross-attention components 410a-410n in FIG. 4A. The final classifier may include an optional averaging component to receive the representation embeddings 456 and perform averaging to obtain a single representation embedding. Finally, the classifier MLP 414 outputs a classification result of whether the audio data is real or fake. In some embodiments, the classification output may comprise a probability value (e.g., a probability indicative of whether the audio data is fake, a probability indicative of whether the audio data is real). In some embodiments, the classification output may comprise a binary value.

Data Augmentations

In some embodiments, a suitable data augmentation policy may be used to support the training framework in three ways: prevent overfitting, handle speaker variability, and achieve robustness to telephony codec impairments. One or more of the following augmentations may be used: pitch-shift, time-stretch, time and frequency masking from WavAugment; linear and non-linear convolutive noise and impulsive signal dependent additive noise from RawBoost; and/or narrowband frequency impulse response (FIR) filters. Note that the augmentations may be applied on-the-fly or dynamically during the model training.

Exemplary Process

Figure 4C:
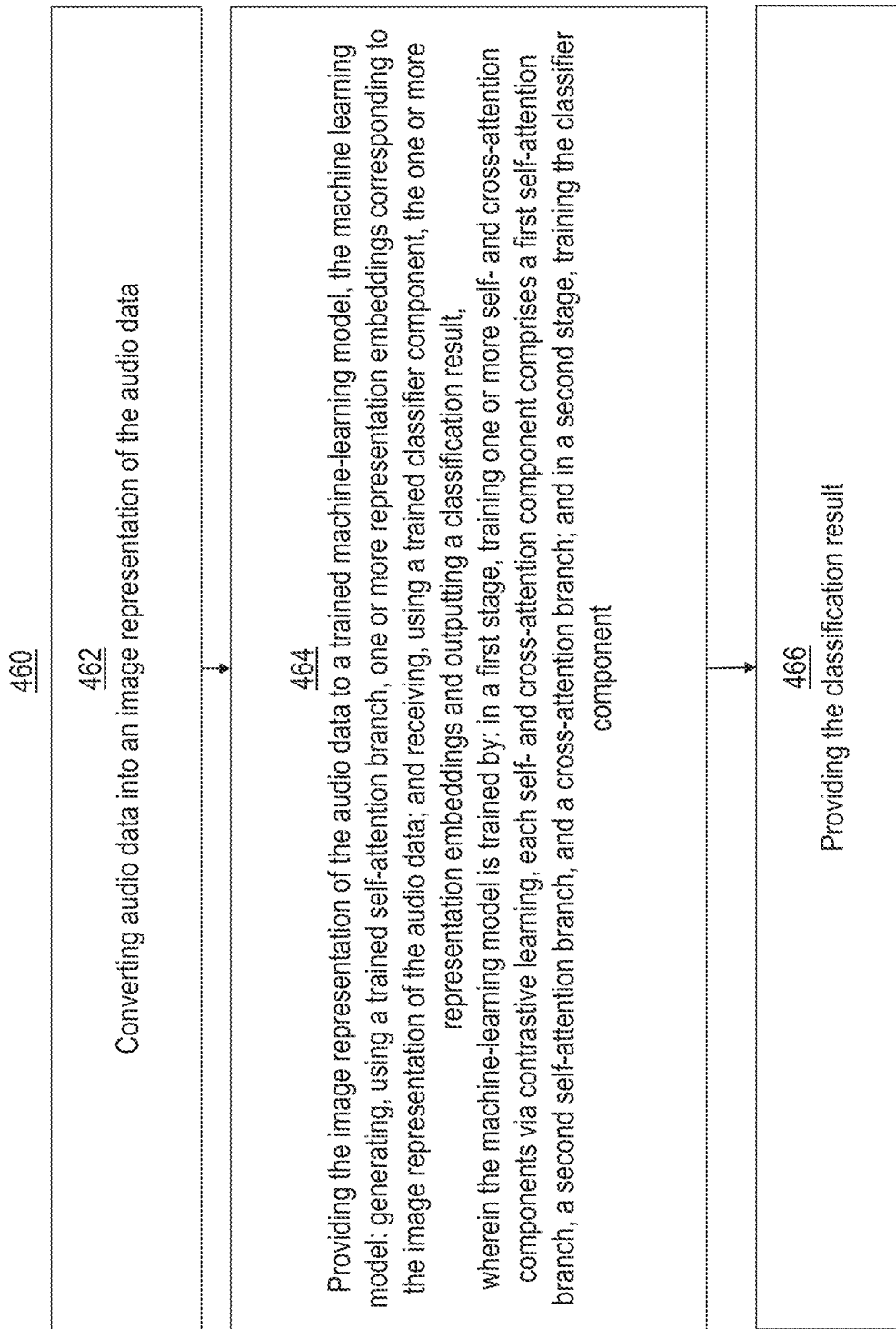
FIG. 4C illustrates an exemplary process for detecting fake audios in accordance with some embodiments of the present disclosure.

FIG. 4C illustrates process 460 for detecting fake audios, according to various examples. Process 460 is performed, for example, using one or more electronic devices implementing a software platform. In some examples, process 460 is performed using a client-server system, and the blocks of process 460 are divided up in any manner between the server and a client device. In other examples, the blocks of process 460 are divided up between the server and multiple client devices. Thus, while portions of process 460 are described herein as being performed by particular devices of a client-server system, it will be appreciated that process 460 is not so limited. In other examples, process 460 is performed using only a client device (e.g., user device 100) or only multiple client devices. In process 460, some blocks are, optionally, combined, the order of some blocks is, optionally, changed, and some blocks are, optionally, omitted. In some examples, additional steps may be performed in combination with the process 460. Accordingly, the operations as illustrated (and described in greater detail below) are exemplary by nature and, as such, should not be viewed as limiting.

An exemplary method for detecting fake audios comprises: at block 462, converting audio data into an image representation (e.g., x in FIG. 4B) of the audio data; at block 464, providing the image representation of the audio data to a trained machine-learning model, the machine learning model: generating, using a trained self-attention branch (e.g., self-attention branch 409 in FIG. 4B), one or more representation embeddings corresponding to the image representation of the audio data; and receiving, using a trained classifier component (e.g., classifier MLP 414 in FIG. 4B), the one or more representation embeddings and outputting a classification result; and wherein the machine-learning model is trained by: in a first stage, training one or more self- and cross-attention components (e.g., 410a-n in FIG. 4A) via contrastive learning, each self- and cross-attention component comprises a first self-attention branch, a second self-attention branch, and a cross-attention branch; and in a second stage, training the classifier component; and at block 466, providing the classification result.

In some embodiments, converting the audio data into the image representation of the audio data comprises: receiving audio waveforms; and converting the audio waveforms into a spectrogram.

In some embodiments, the classification result comprises a binary value or a probability value. In some embodiments, the audio is AI-generated.

In some embodiments, the one or more self- and cross-attention components are configured to: generate a first representation embedding (e.g., $r_1^{SA}$ in FIG. 4A) corresponding to a first input corresponding to a first training audio, generate a second representation embedding (e.g., $r_2^{SA}$ in FIG. 4A) corresponding to a second input corresponding to a second training audio, and generating a cross-attention representation embedding (e.g., $r_{12}^{CA}$ in FIG. 4A) corresponding to both the first input and the second input. In some embodiments, a contrastive loss (e.g., $L_{con}$ in FIG. 4A) is calculated based on the first representation embedding, the second representation embedding, and the cross-attention representation embedding.

In some embodiments, training one or more self- and cross-attention components via contrastive learning comprises increasing the difference between representation embeddings of real audios and representation embeddings of fake audios.

In some embodiments, the first self-attention branch in each self- and cross-attention component is configured to generate a first query matrix, a first key matrix, and a first value matrix (e.g., $Q_1$, $K_1$, $V_1$ in FIG. 4A), the second self-attention branch in each self- and cross-attention component is configured to generate a second query matrix, a second key matrix, and a second value matrix (e.g., $Q_2$, $K_2$, $V_2$) in FIG. 4A), and the cross-attention branch in each self- and cross-attention component is configured to receive the first query matrix, the second key matrix, and the second value matrix.

In some embodiments, the first self-attention branch in each self- and cross-attention component comprises a first multi-head self-attention mechanism (e.g., MH+SA in FIG. 4A) for processing the first query matrix, the first key matrix, and the first value matrix, the second self-attention branch in each self- and cross-attention component comprises a second multi-head self-attention mechanism (e.g., MH+SA in FIG. 4A) for processing the second query matrix, the second key matrix, and the second value matrix, and the cross-attention branch in each self- and cross-attention component comprises a multi-head cross-attention (e.g., MH+CA in FIG. 4A) mechanism for processing the first query matrix, the second key matrix, and the second value matrix.

In some embodiments, the trained machine-learning model further comprises: a trained patch split component (e.g., patch split component 402 in FIGS. 4A-B) for splitting the image representation of the audio into a sequence of image patches.

In some embodiments, the trained machine-learning model further comprises: a trained projection component (e.g., projection component 406 in FIGS. 4A-B) for generating, based on the sequence of image patches, a plurality of embeddings for input into the trained self-attention branch.

An exemplary system for detecting fake audios comprises: one or more processors, a memory, and one or more programs, wherein the one or more programs are stored in the memory and configured to be executed by the one or more processors, the one or more programs including instructions for: converting audio data into an image representation of the audio data; providing the image representation of the audio data to a trained machine-learning model, the machine learning model: generating, using a trained self-attention branch, one or more representation embeddings corresponding to the image representation of the audio data; and receiving, using a trained classifier component, the one or more representation embeddings and outputting a classification result; and wherein the machine-learning model is trained by: in a first stage, training one or more self- and cross-attention components via contrastive learning, each self- and cross-attention component comprises a first self-attention branch, a second self-attention branch, and a cross-attention branch; and in a second stage, training the classifier component; and providing the classification result.

An exemplary non-transitory computer-readable storage medium stores one or more programs for detecting fake audios, the one or more programs comprising instructions, which when executed by one or more processors of an electronic device having a display, cause the electronic device to: convert audio data into an image representation of the audio data; provide the image representation of the audio data to a trained machine-learning model, the machine learning model: generating, using a trained self-attention branch, one or more representation embeddings corresponding to the image representation of the audio data; and receiving, using a trained classifier component, the one or more representation embeddings and outputting a classification result; and wherein the machine-learning model is trained by: in a first stage, training one or more self- and cross-attention components via contrastive learning, each self- and cross-attention component comprises a first self-attention branch, a second self-attention branch, and a cross-attention branch; and in a second stage, training the classifier component; and provide the classification result.

An exemplary method for training a machine-learning model to detect fake audios comprises: in a first stage, training one or more self- and cross-attention components of the machine-learning model via contrastive learning, each self- and cross-attention component comprises a first self-attention branch, a second self-attention branch, and a cross-attention branch; and in a second stage, training a classifier component of the machine-learning model, wherein the classifier is configured to receive one or more representation embeddings generated by a self-attention branch trained in the first stage and output a classification result.

In some embodiments, the one or more representation embeddings correspond to an image representation of audio data.

In some embodiments, the image presentation of the audio data is generated by: receiving audio waveforms; and converting the audio waveforms into a spectrogram.

In some embodiments, the classification result comprises a binary value or a probability value.

An exemplary system comprises: one or more processors, a memory, and one or more programs, wherein the one or more programs are stored in the memory and configured to be executed by the one or more processors, the one or more programs including instructions for: in a first stage, training one or more self- and cross-attention components of the machine-learning model via contrastive learning, each self- and cross-attention component comprises a first self-attention branch, a second self-attention branch, and a cross-attention branch; and in a second stage, training a classifier component of the machine-learning model, wherein the classifier is configured to receive one or more representation embeddings generated by a self-attention branch trained in the first stage and output a classification result.

An exemplary non-transitory computer-readable storage medium stores one or more programs, the one or more programs comprising instructions, which when executed by one or more processors of an electronic device having a display, cause the electronic device to: in a first stage, train one or more self- and cross-attention components of the machine-learning model via contrastive learning, each self- and cross-attention component comprises a first self-attention branch, a second self-attention branch, and a cross-attention branch; and in a second stage, train a classifier component of the machine-learning model, wherein the classifier is configured to receive one or more representation embeddings generated by a self-attention branch trained in the first stage and output a classification result.

Experiments and Results

The audio content may be preprocessed. Notably, raw audio waveforms of, e.g., length 6-seconds may be used to create log-mel spectrograms of size 128 mel-frequency bins and 512 time bins, which may be computed using PyTorch-Kaldi with a 25 ms Hanning window and a 10 ms overlap. Longer waveforms may be cut off at the end, while shorter waveforms may be repeat padded by concatenating the original signal with its time-inverted version until the length is 6 s.

Then, the audio content may be sampled and batched. Notably, for the contrastive learning in Stage I, data pairs $(x_1, x_2)$ may be created as follows. The sample $x_1$ may be picked up in sequence from the training dataset, covering each datapoint once over a training epoch. For each $x_1$, the class information $c(x_1)$ may be used to select the pairing sample $x_2$ such that positive and negative pairs are created with equal probability of 0.5. When picking up $x_2$ from the fake class, an equal probability of 0.5 may be assigned to the text-to-speech (TTS) and voice conversion (VC) subclasses. Once a pair is picked, each of the data augmentations from the previous discussion may be applied to $x_1$ with a probability of 0.8, and a randomly selected subset of data augmentations may be applied to $x_2$. This procedure may be repeated until a batch of, e.g., 64 pairs is created. During Stage II, batches of size 64 may be picked sequentially from the dataset. To each sample, the data augmentations may be applied with, e.g., 0.8 probability.

Regarding the training policy, note that for both Stage I and II, an Adam optimizer may be used with a learning rate of 10-4, and may be used with an exponential rate decay scheduler with γ=0.95 for every 5 epochs. The model may be trained, e.g., for 50 epochs for each stage. For Stage I, the epoch checkpoint reporting the least validation loss may be chosen. Moreover, for Stage II, the epoch checkpoint reporting the smallest validation EER may be chosen.

Impact of Data Augmentation, Contrastive Learning and Cross-Attention

Figure 5:
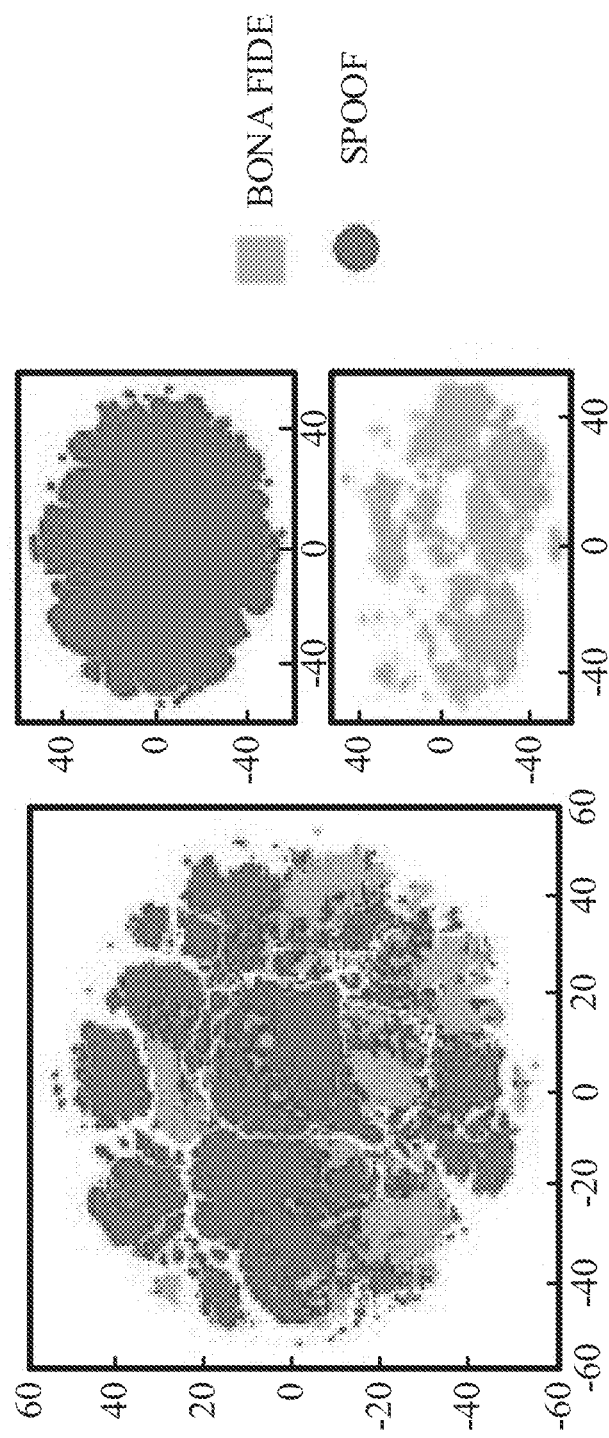
FIG. 5 illustrates exemplary representation embeddings generated by a baseline artificial neural network in accordance with some embodiments of the present disclosure.

FIG. 5 illustrates representation embeddings (e.g., t-SNE embeddings) generated by for a baseline artificial neural network, such as the WCE baseline. Each dot in the figure represents a representation embedding. As shown, the representation embeddings for the real class and the fake class have significant overlap, indicating that the baseline model cannot generate sufficiently different embeddings for the two classes.

Figure 6:
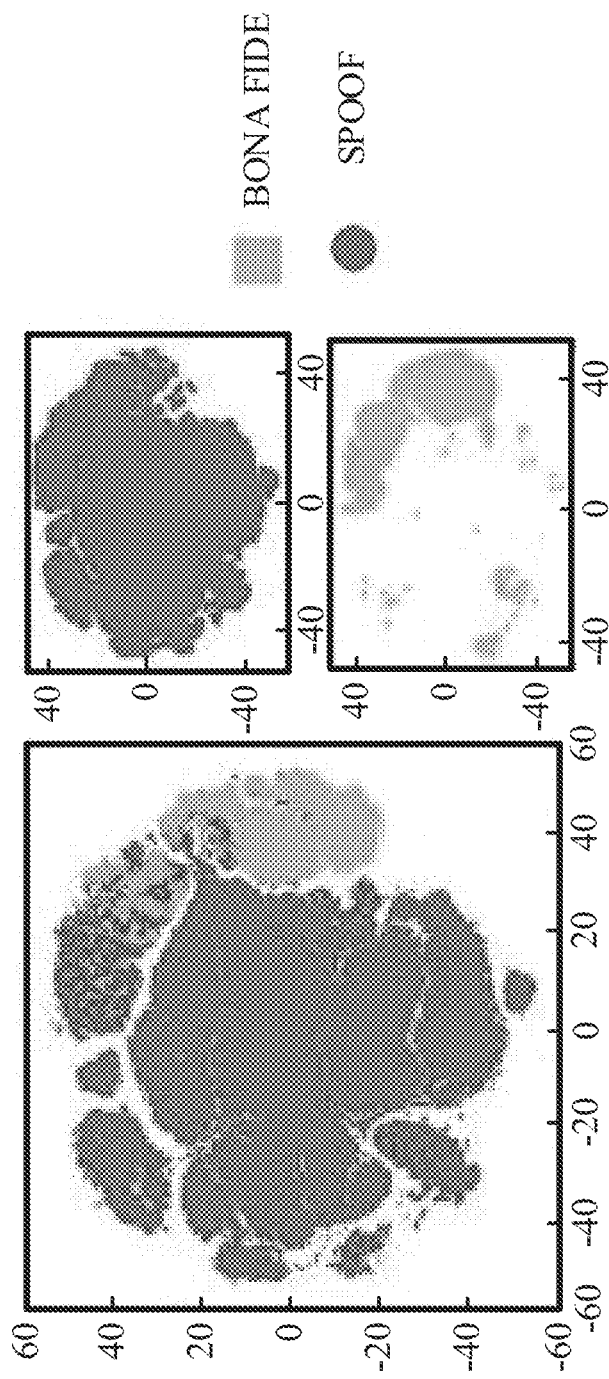
FIG. 6 illustrates exemplary representation embeddings generated by an artificial neural network with self-attention in accordance with some embodiments of the present disclosure.

FIG. 6 illustrates representation embeddings (e.g., t-SNE embeddings) generated by an artificial neural network, such as the SSAST-CL, with self-attention only. Each dot in the figure represents a representation embedding. As shown, the representation embeddings for the real class and the fake class have significantly less overlap, indicating that the self-attention mechanism can generate fairly different embeddings for the two classes.

Figure 7:
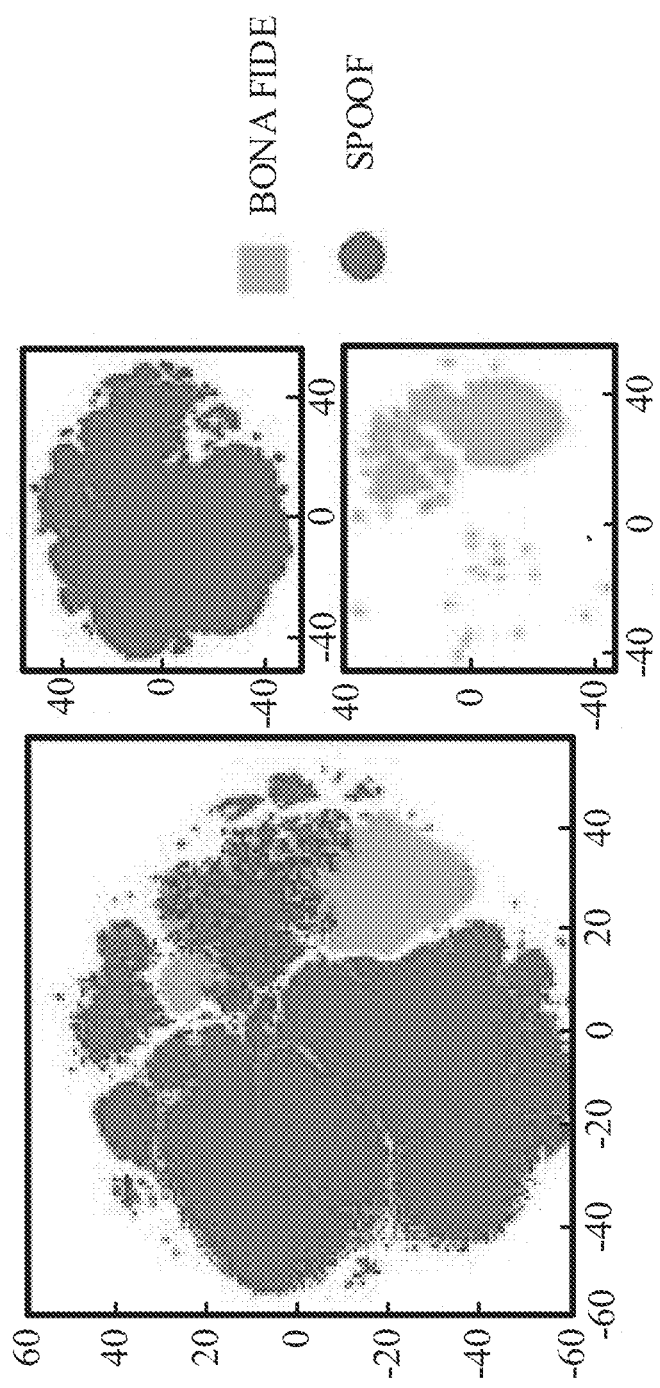
FIG. 7 illustrates exemplary representation embeddings generated by an artificial neural network with self-attention and cross-attention in accordance with some embodiments of the present disclosure.

FIG. 7 illustrates representation embeddings (e.g., t-SNE embeddings) generated by artificial neural network, such as the SSAST-CL, with self-attention and cross-attention, such as the embodiment shown in FIGS. 4A-B. Each dot in the figure represents a representation embedding (e.g., representation embedding 458 in FIG. 4B). As shown, the representation embeddings for the real class and the fake class also have significantly less overlap, indicating that the self-attention mechanism and the cross-attention mechanism can generate fairly different embeddings for the two classes. There is an improvement from introducing cross-attention, although the visual differences in FIGS. 6-7 are subtle because the high reduction in dimensionality from 192 to 2 when plotting the t-SNEs.

The trained artificial neural network with the contrastive framework may provide an improved EER. FIG. 8 compares the performance of the disclosed contrastive learning framework against baselines that finetune the pretrained SSAST using weighted cross-entropy (WCE). The baseline WCE, which follows the disclosed training and augmentation policy, reports a high EER of 19.48 on the ASVspoof 2021 logical access evaluation set. This is likely because the augmentations in the baseline WCE may not account for codec impairments. When the disclosed augmentation policy including ablation is used, the resulting WCE-updated policy results in an EER of 8.96, which is marginally better than the 9.26 result of the best-performing baseline model in ASVspoof 2021. When the training framework is additionally replaced with the disclosed SSAST-CL framework, the EER improves significantly to 4.74. Note that WCE-updated is the same as baseline WCE, but with the disclosed augmentation policy. Also note that smaller EERs indicate improved performance.

FIG. 8 also demonstrates the impact of introducing cross-attention. Note that the EER improves from 5.64 to 4.74 when a weight of $\alpha=0.2$ is set to the cross-attention loss term $L_{CA}$. The t-distributed stochastic neighbor embedding (t-SNE) plots shown FIGS. 5-7 suggest that the SSAST-CL framework better disentangles the real and fake classes when compared to the baseline WCE model.

While the impact of SSAST-CL is evident from FIG. 8 and FIGS. 6 and 7, we note that the disclosed framework may not be fully optimized to report the best EERs. A grid search on the training hyperparameters, including the optimizer, learning rate, batch size, and cross-attention weight, may boost the EERs further.

Comparison with ASVSpoof21 Top-Performing Models

FIG. 9 compares the performance of the proposed SSAS-TCL system against the top-performing single system models on the ASVSpoof 2021 LA evaluation dataset. Firstly, our system comprehensively outperforms the challenge's best-performing baseline B03. Thus, an audio ViT, with appropriate training and data augmentations, can indeed achieve competitive performance on the audio spoof detection task. Note that a vanilla WCE finetuning on the SSAST model results in worse EER than the challenge baseline. Secondly, when positioned against the best-performing models, our system reports comparable EERs while being significantly smaller in size (i.e., the number of parameters) than most of them. The LCNN-LSTM is the only lightweight system that reports a smaller EER than us. LCNN-LSTM is a simple Neural Network (NN), whereas SSAST-CL is an attention-based ViT model. Thus, the embodiments of the present disclosure introduce the use of attention-based models for audio deepfake detection and show that they can achieve similar performance as SOTA NN models, thus opening up a new line of work for deepfake detection. Lastly, our augmentations are much simpler than in the ResNet-LDE and ResNet-34 systems, as our system does not use external noise or impulse response datasets for the augmentations.

Ablation on Data Augmentations

FIG. 10 shows ablation over data augmentation combinations for the proposed SSAST-CL framework. Note that the Raw-Boost and FIR augmentations may be both important for the model to perform well. These augmentations differ in design but both help capture the telephony codec artifacts, although to different extents. Telephony impairments are known to be present in the ASVSpoof 2021 LA dataset. The remaining augmentations in our policy, namely, time masking, frequency masking, pitch shift, and time stretch, can be helpful because they account for speaker variability and prevent the model from overfitting.

In summary, the computational techniques leverage ViTs for the audio spoof detection task. Notably, the disclosed SSAST-CL adapts the SSAST model for contrastive learning. A finetuning of the pretrained SSAST with cross-entropy loss may provide sub-optimal performance. In order to learn more discriminative audio representations, the SSAST-CL framework may use Siamese training with a cross-attention branch and a novel contrastive loss formulation. An MLP may be subsequently used to classify the learned representations as real or fake. The SSAST-CL framework may successfully disentangle the real and fake classes, and it may help learn better classifiers for the task at hand. The introduction of cross-attention, along with suitable augmentations, may allow the disclosed framework to achieve competitive performance on the ASVspoof 2021 challenge.

In some embodiments, a joint training of the two stages in the framework (e.g., using a multi-task loss formulation) may improve the model performance and may also reduce the training time. Moreover, an importance sampling/training policy may be used to prioritize hard-to-learn samples (such as voice conversions). Moreover, the contrastive learning framework may be extended to other downstream audio tasks where limited training data is available, such as emotion recognition and/or language identification.

FIG. 11 illustrates an example of a computing device in accordance with one embodiment. Device 1100 can be a host computer connected to a network. Device 1100 can be a client computer or a server. As shown in FIG. 11, device 1100 can be any suitable type of microprocessor-based device, such as a personal computer, workstation, server or handheld computing device (portable electronic device) such as a phone or tablet. The device can include, for example, one or more of processor 1110, input device 1120, output device 1130, storage 1140, and communication device 1160. Input device 1120 and output device 1130 can generally correspond to those described above, and can either be connectable or integrated with the computer.

Input device 1120 can be any suitable device that provides input, such as a touch screen, keyboard or keypad, mouse, or voice-recognition device. Output device 1130 can be any suitable device that provides output, such as a touch screen, haptics device, or speaker.

Storage 1140 can be any suitable device that provides storage, such as an electrical, magnetic or optical memory including a RAM, cache, hard drive, or removable storage disk. Communication device 1160 can include any suitable device capable of transmitting and receiving signals over a network, such as a network interface chip or device. The components of the computer can be connected in any suitable manner, such as via a physical bus or wirelessly.

Software 1150, which can be stored in storage 1140 and executed by processor 1110, can include, for example, the programming that embodies the functionality of the present disclosure (e.g., as embodied in the devices as described above). Software 1150 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1140, that can contain or store programming for use by or in connection with an instruction execution system, apparatus, or device.

Software 1150 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1100 can implement any operating system suitable for operating on the network. Software 1150 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. A method for detecting fake audios, comprising:
converting audio data into an image representation of the audio data;
providing the image representation of the audio data to a trained machine-learning model, wherein the trained machine-learning model comprises a trained patch split component for splitting the image representation of the audio data into a sequence of image patches, the machine learning model:
generating, using a trained self-attention branch, one or more representation embeddings based on the image representation of the audio data; and
receiving, using a trained classifier component, the one or more representation embeddings and outputting a classification result; and
providing the classification result.

2. The method of claim 1, wherein converting the audio data into the image representation of the audio data comprises:
receiving audio waveforms; and
converting the audio waveforms into a spectrogram.

3. The method of claim 1, wherein the classification result comprises a binary value.

4. The method of claim 1, wherein the classification result comprises a probability value.

5. The method of claim 1, wherein the audio is AI-generated.

6. The method of claim 1, wherein the machine learning model is trained by: in a first stage, training one or more self- and cross-attention components via contrastive learning.

7. The method of claim 6, wherein the one or more self- and cross-attention components comprise a first self-attention branch, a second self-attention branch, and a cross-attention branch.

8. The method of claim 7, wherein the trained self-attention branch is based on the first self-attention branch or the second self-attention branch of the one or more self- and cross-attention components.

9. The method of claim 8, wherein the machine learning model is trained by: in a second stage, training the classifier component.

10. The method of claim 9, wherein the one or more self- and cross-attention components are configured to, during training:
generate a first training representation embedding corresponding to a first input corresponding to a first training audio,
generate a second training representation embedding corresponding to a second input corresponding to a second training audio, and
generating a training cross-attention representation embedding corresponding to both the first input and the second input.

11. The method of claim 10, wherein a contrastive loss is calculated based on the first training representation embedding, the second training representation embedding, and the training cross-attention representation embedding.

12. The method of claim 10, wherein training one or more self- and cross-attention components via contrastive learning comprises increasing the difference between training representation embeddings of real audios and representation embeddings of fake audios.

13. The method of claim 9, wherein
the first self-attention branch in the one or more self- and cross-attention components is configured to generate a first query matrix, a first key matrix, and a first value matrix,
the second self-attention branch in the one or more self- and cross-attention components is configured to generate a second query matrix, a second key matrix, and a second value matrix, and
the cross-attention branch in the one or more self- and cross-attention components is configured to receive the first query matrix, the second key matrix, and the second value matrix.

14. The method of claim 13, wherein
the first self-attention branch in the one or more self- and cross-attention components comprises a first multi-head self-attention mechanism for processing the first query matrix, the first key matrix, and the first value matrix,
the second self-attention branch in the one or more self- and cross-attention components comprises a second multi-head self-attention mechanism for processing the second query matrix, the second key matrix, and the second value matrix, and
the cross-attention branch in the one or more self- and cross-attention components comprises a multi-head cross-attention mechanism for processing the first query matrix, the second key matrix, and the second value matrix.

15. The method of claim 1, wherein the trained machine-learning model further comprises: a trained projection component for generating, based on the sequence of image patches, a plurality of embeddings for input into the trained self-attention branch.

16. A system for detecting fake audios, comprising:
one or more processors, a memory, and one or more programs, wherein the one or more programs are stored in the memory and configured to be executed by the one or more processors, the one or more programs including instructions for:
converting audio data into an image representation of the audio data;
providing the image representation of the audio data to a trained machine-learning model, wherein the trained machine-learning model comprises a trained patch split component for splitting the image representation of the audio data into a sequence of image patches, the machine learning model:
generating, using a trained self-attention branch, one or more representation embeddings based on the image representation of the audio data; and
receiving, using a trained classifier component, the one or more representation embeddings and outputting a classification result; and
providing the classification result.

17. A non-transitory computer-readable storage medium storing one or more programs for detecting fake audios, the one or more programs comprising instructions, which when executed by one or more processors of an electronic device having a display, cause the electronic device to:
convert audio data into an image representation of the audio data;
provide the image representation of the audio data to a trained machine-learning model, wherein the trained machine-learning model comprises a trained patch split component for splitting the image representation of the audio data into a sequence of image patches, the machine learning model:
generating, using a trained self-attention branch, one or more representation embeddings based on the image representation of the audio data; and
receiving, using a trained classifier component, the one or more representation embeddings and outputting a classification result; and
provide the classification result.

* * * * *